123 - 41.58

Search

Dec. 31, 1935. H. L. McPHERSON Re. 19,800

COWL VENTILATOR

Original Filed Dec. 29, 1927 2 Sheets-Sheet 1

INVENTOR
Harry L. McPherson
By J. H. Weatherford
ATTORNEY

Search Room

Dec. 31, 1935. H. L. McPHERSON Re. 19,800

COWL VENTILATOR

Original Filed Dec. 29, 1927 2 Sheets-Sheet 2

INVENTOR
Harry L. McPherson
by J. H. Weatherford
ATTORNEY.

Reissued Dec. 31, 1935

Re. 19,800

UNITED STATES PATENT OFFICE 19,800

COWL VENTILATOR

Harry L. McPherson, Memphis, Tenn.

Original No. 1,934,944, dated November 14, 1933, Serial No. 243,234, December 29, 1927. Application for reissue August 13, 1934, Serial No. 739,640

20 Claims. (Cl. 244—31)

This invention relates to improvements in cowl ventilators for airplanes or the like, and has especial relation to means for regulating or controlling the air delivered for purposes of cooling the cylinders of an air cooled motor and for reducing the resistance of such parts incident to their rapid passage through the air.

In designing airplanes, which necessarily move through the air at high velocities, every effort is made to stream line the parts so that minimum resistance may be offered to passage of the planes through the air. With the advent of air cooled motors, the cylinders have been allowed to protrude through the cowl in order to effect the necessary cooling, and the resistance set up by these cylinders has materially added to the resistance of the plane and has to a considerable extent disturbed the stream line and added a resistance out of all proportion to the apparent obstruction.

With these facts in view, the objects of this invention are:

(*a*) To establish a stream line cowl for an air cooled motor;

(*b*) To separate the cylinder cooling air from the remaining air passing the plane, to effect the cooling of the cylinders with such separated air, to reconcentrate such air into a smooth flowing stream, and to deliver same into the exterior air stream in a direction effective to decrease resistance;

(*c*) To regulate the amount of cooling air diverted past the cylinders to be cooled;

(*d*) To reduce the air velocity adjacent the cylinders;

(*e*) To provide ready access to the cylinders for repairs, or adjustment;

(*f*) To restore the air velocity as the diverted air is restored to the primary stream; and (*g*) To generally improve the design and construction of such structures.

The means by which the foregoing and other objects are accomplished and the manner of their accomplishment will readily be understood from the following specification on reference to the accompanying drawings in which.

Figure 1:
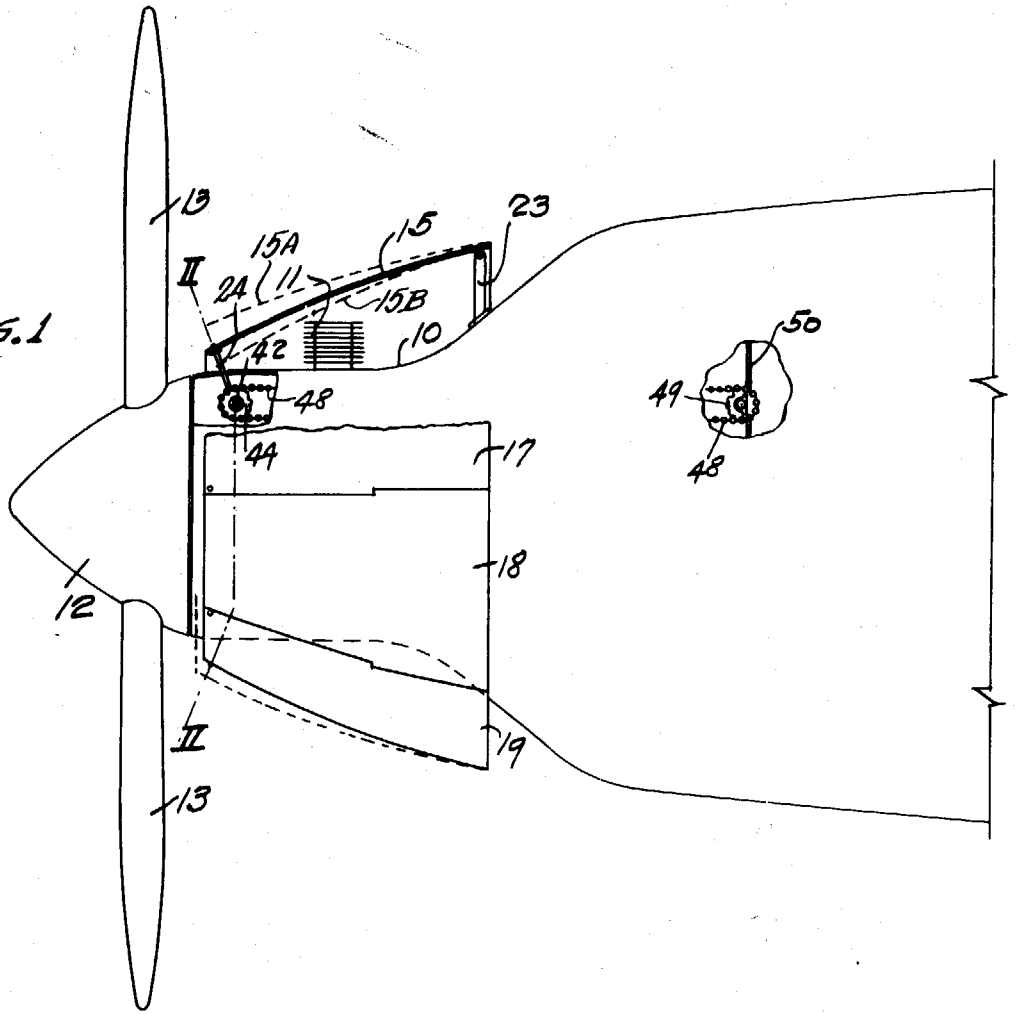
Fig. 1 is a side elevation of the front portion of an airplane showing a part of the cowl in section.
Figure 4:
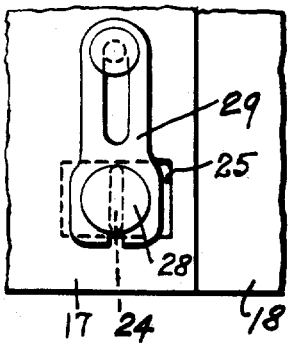
Fig. 4 is a similarly enlarged detail showing a locking washer on the outer surface of the cowl.

Referring now to the drawings in which the parts are designated by numerals;

10 is an inner cowl through which the cylinders 11 project. 12 is the nose of the plane and 13 the propeller blades.

Surrounding the cylinders, and enclosing them circumferentially, is a sectional cowl made up of a number of sections, 14, 15, 16, 17 etc., preferably one for each of the engine cylinders.

At the rear, each of the sections is supported by posts 23, which project outward from the inner cowl 10, and to which posts they are hinged, each post supporting the adjacent edges of two sections, so that each section has its two edges supported and hinged at the rear end.

Figure 3:
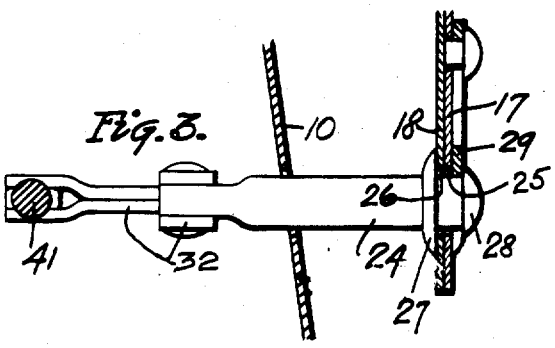
Fig. 3 is a sectional detail on a more enlarged scale taken on the line III—III of Fig. 2 showing a means for securing the cowl plates to the adjusting mechanism.

At the forward end the sections overlap, section 15 for example preferably overlying the adjacent sections 14 and 16, sections 17, overlying 16 and 18. These forward ends are movable inward or outward, that is toward or away from the inner cowl 10, so that the annular space therebetween may be decreased or enlarged. To accomplish this, thrust members 24 are extended outward through the inner cowl 10, near the forward end of these sections and passed through slots 25, 26 in the overlapped sections, as for instance 17, 18, (Fig. 3). Integral with the members 24 are inner collars 27 which are of greater size than the slots 25, 26 and outer heads 28 of less size than these slots.

29 are slotted washers which may be disposed between the heads 28 and the outer surfaces of the overlapping sections to secure them to the members 24 firmly but not sufficiently tight to prevent their sliding the one on the other when adjustment is made. By removing these washers the sections may be disconnected from the thrust members and thereafter be turned back to give access to the engine cylinders.

Within the cowl 10, these rods are connected to bell crank levers 30 to 38 inclusive which are pivoted in brackets 39 and 40, secured to the inner surface of the cowl. Bell crank lever 30 and 31; 31 and 32; 32 and 33; 33 and 34; 35 and 36; 36 and 37; 37 and 38; are connected together in pairs by connecting rods 41, and bell crank levers 34 and 35, by a threaded connecting rod 42, the ends of the rods being pivotally attached to their corresponding levers. No connection need be established between levers 38 and 40.

44 is a sprocket wheel which has an integral, interiorly threaded hub 45, which is disposed on the correspondingly threaded rod 42.

The wheel 44 may be turned on the rod 42 and is held against lateral movement by a double bracket 46, having bracing arms 47, whose extremities are preferably disposed between the brackets 40 and the cowl 10, and secured to the cowl by the fastenings that are used to secure these brackets.

Figure 2:
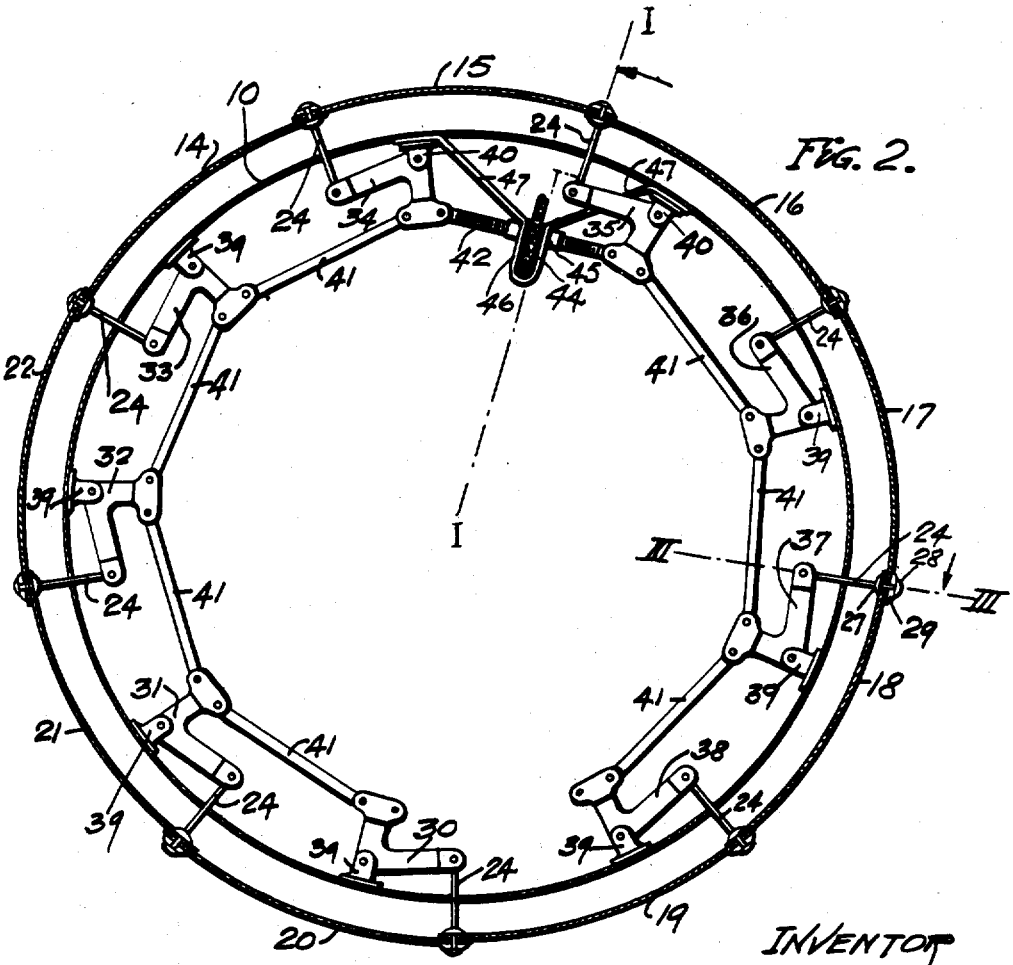
Fig. 2 is a sectional elevation on a larger scale taken on the line II—II of Fig. 1 showing one form of regulating mechanism.

48 is a sprocket chain disposed over the sprocket wheel 44 and extending therefrom to a control sprocket wheel 49 on the instrument board 50 of the plane. When therefore the wheel 49 on the instrument board is rotated the threaded hub of the wheel 44 shifts the rod 42 to the left or right as the case may be. If to the left (Fig. 2) all the bell crank levers will be correspondingly shifted and the thrust members 24 moved outward concurrently thus moving the forward ends of the sections 14, 15 etc. outward and enlarging the annular space around the inner cowl, and increasing the amount of air diverted past the cylinders.

If the rod 42 is shifted to the right the sections are drawn inward, decreasing the annular space, and correspondingly the amount of air allowed to pass the cylinders.

It will be especially noted that the sectional cowl is shaped to conform to the general stream line of the nose, and of the body of the plane behind the sectional cowl. It will further be noted that the annular space between the sectional cowl and the inner cowl increases from front to rear, at least as far as the cylinders, so that air diverted to the cylinders will pass into an enlarging space and be allowed to slow down in velocity while passing the cylinders, thus reducing the resistance set up by the cylinders to such air passage. After passing the cylinders the air is diverted outward by the inner cowl and into the air stream passing over the outer or sectional cowl.

It will further be noted that all exposed parts such as the thrust rods 24, the collar 27 and the heads 28 and even the forward ends of the washers 29 are stream lined so far as possible to reduce air resistance, the posts 23 being also so stream lined.

In use the operation of the device may be controlled from the instrument board, by turning the hand wheel 49. This motion is transmitted through the chain 48 to the wheel 44 and the opening or closing of the front of the sectional cowl thereby effected.

By the use of such a device the head resistance may be cut down and increased mileage and speed result. At the same time the motor temperatures may be controlled and increased efficiencies be thereby obtained.

It will be distinctly understood that the drawings are introduced for the purpose of illustration only and particularly that the means whereby the opening and closing of the sectional cowl is effected is typical only.

It is therefore to be distinctly understood that I do not wish to be limited to the detail herein shown and described, except where such limitation is specifically set out in the claims.

It will further be understood that the term "nose" while inclusive of the term spinner is not limited to such term; and it will further be understood that in the appended claims, I specifically disclaim any structure in which the inner cowl is not a part additional to the crank case of the engine.

Having described the invention, what I claim is:

1. A power plant, comprising a cowl, a plurality of cylinders projecting therethrough, and an auxiliary cowl surrounding said cylinders, said auxiliary cowl comprising alternate over-lapping and underlying sections, each disposed over a cylinder, means for supporting the rear ends of said sections and joint means for adjustably supporting the forward ends of the lapped edges of each two sections.

2. A power plant, comprising a cowl, a plurality of cylinders projecting therethrough, and an auxiliary cowl surrounding said cylinders, said auxiliary cowl comprising alternate over-lapping and underlying sections, each disposed over a cylinder, means for hingedly supporting the rear ends of said sections, and releasable means for supporting the forward ends of the lapped edges of each two sections.

3. In an air cooled engine assembly, an inner cowl, a sectional outer cowl comprising a plurality of lapping sections, means for supporting the rear ends of said sections, and means for adjusting the front ends thereof.

4. A power plant comprising an inner cowl, a plurality of cylinders projecting therethrough, an auxiliary cowl surrounding said inner cowl and cylinders, said auxiliary cowl comprising alternate over-lapping and underlying sections, each disposed over a cylinder, means for supporting the rear ends of said sections, and joint means supporting the forward end of the lapped edges of each two sections.

5. A power plant comprising an inner cowl, a plurality of cylinders projecting therethrough, an auxiliary cowl surrounding said inner cowl and cylinders, the front end of said auxiliary cowl being spaced from said inner cowl and the area between said cowls increasing rearwardly, means for supporting the rear end of said auxiliary cowl, and means for adjusting the spacing of the front end of said auxiliary cowl from said inner cowl.

6. In an air cooled engine, an annular inner cowl, a plurality of cylinders projecting outward through said cowl, an annular sectional cowl surrounding, and spaced away from, said inner cowl and cylinders, the distance between said cowls diverging rearwardly, and means for varying the distance of the front of said sectional cowl from said inner cowl.

7. In an air cooled engine, an annular inner cowl, a plurality of cylinders projecting outward through said cowl, an annular sectional cowl comprising a plurality of lapping sections, surrounding, and spaced away from, said inner cowl and cylinders, means for supporting the rear ends of said cowl sections, and means for varying the distance of the front ends of said cowl sections from said inner cowl.

8. In an air cooled engine, an annular inner cowl, a plurality of cylinders projecting outward through said cowl, an annular sectional cowl surrounding, and spaced away from, said inner cowl and cylinders, the area between said cowls diverging rearwardly, posts extending outward from said inner cowl, pivotal means connecting said sectional cowl to said posts, and means for varying the distance of the front of said sectional cowl from said inner cowl.

9. In an air cooled engine, an inner cowl, an outer cowl comprising a plurality of sections, posts projecting from said inner cowl, pivotal means securing the rear end of said sections to Search Re said posts, rods projecting from within said inner cowl and secured to the forward end of sections, bell crank levers within said inner cowl each secured to one of said rods, linkage connecting said bell crank levers, and means for shifting said links to shift said rods inward and outward.

10. In an air cooled engine, an inner cowl, an annular outer cowl comprising a plurality of sections, posts projecting from said inner cowl, pivotal means securing the rear end of said sections to said posts, rods projecting from within said inner cowl and secured to the forward end of said sections, bell crank levers within said inner cowl each secured to one of said rods, linkage connecting said bell crank levers, and means for shifting said links to shift said rods inward and outward.

11. In an air cooled engine, an annular inner cowl, an annular outer cowl surrounding said inner cowl and diverging rearwardly, said outer cowl comprising a plurality of sections, posts projecting from said inner cowl, pivotal means securing the rear end of said sections to said posts, rods projecting from within said inner cowl and secured to the forward end of said sections, bell crank levers within said inner cowl each secured to one of said rods, linkage connecting said bell crank levers, and means for shifting said links to shift said rods inward and outward.

12. In an air cooled engine assembly, an inner cowl, a sectional outer cowl comprising a plurality of lapping sections, means for supporting the rear ends of said sections, and means for adjusting the front ends of said sections, including rods, each supporting the lapped edges of two sections.

13. A power plant, comprising an inner cowl, a plurality of engine cylinders projecting therethrough, an auxiliary cowl surrounding said inner cowl and cylinders, said auxiliary cowl comprising sections, means for hingedly supporting the rear ends of said sections, and means for releasably supporting the forward ends thereof.

14. In an aeroplane, an annular cowl, a plurality of engine cylinders projecting radially therebeyond, and an auxiliary annular cowl surrounding said inner cowl and projecting cylinders, said auxiliary cowl comprising a plurality of sections, and means for releasably securing the front, and hingedly securing the rear ends of said sections.

15. A power plant, comprising an inner cowl, a plurality of engine cylinders projecting therethrough, an auxiliary cowl surrounding said inner cowl and cylinders, said auxiliary cowl comprising sections, means for supporting the rear ends of said sections, and means for adjustably supporting the forward ends thereof.

16. In an aeroplane having a plurality of engine cylinders radially disposed, an annular cowl surrounding said cylinders, said cowl comprising sections, and means for securing the rear ends of said sections, and means for adjustably securing the forward ends thereof.

17. In an aeroplane having a plurality of engine cylinders radially disposed, a cowl surrounding said cylinders, said cowl comprising sections, means for hinging the rear ends of said sections, and means for releasably securing the forward ends thereof.

18. In an airplane, having radial engine cylinders, a nose, a cowl forming a continuation thereof, extending rearwardly therefrom to said cylinders and thence outwardly and rearwardly to a stream line junction with the fuselage of said plane, said cylinders projecting through said cowl; and an auxiliary cowl surrounding said cylinders and annularly spaced at its front and rear ends from said inner cowl.

19. In an airplane, having radial engine cylinders, a nose, an inner cowl forming a continuation thereof, said cowl converging rearwardly from a stream line continuation of said nose toward parallelism with the longitudinal axis of said plane, until said cylinders are reached, and thence enlarging and blending rearwardly into such stream line continuation of said nose, said cylinders projecting outward through said cowl, and an outer cowl surrounding said cylinders and lying intermediate said nose and enlarged portion of said inner cowl, said outer cowl lying substantially parallel to the stream lines joining said nose and said enlarged portion of said inner cowl.

20. In an airplane, having radial engine cylinders, a nose, an inner cowl forming a continuation thereof, diverging rearwardly from a stream line continuation of said nose and toward parallelism with the longitudinal axis of said plane until said cylinders are reached, and thence enlarging and blending rearwardly into a stream line continuation of said nose, said cylinders projecting outward through said cowl; and an outer cowl surrounding said cylinders and lying intermediate said nose and enlarged portion of said inner cowl, said outer cowl lying substantially parallel to the stream lines joining said nose and said enlarged portion of said inner cowl, said outer cowl being annularly spaced at both ends from said inner cowl.

HARRY L. McPHERSON.